US 9,158,076 B2

(12) United States Patent
Guo et al.

(10) Patent No.: US 9,158,076 B2
(45) Date of Patent: Oct. 13, 2015

(54) ON-SITE HOT-MELT QUICK CONNECTOR FOR OPTICAL FIBERS

(75) Inventors: Jianmin Guo, Guangdong (CN); Jie Wei, Guangdong (CN)

(73) Assignee: SHENZHEN SDGI OPTICAL NETWORK TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 13/822,683

(22) PCT Filed: Aug. 29, 2012

(86) PCT No.: PCT/CN2012/080725
§ 371 (c)(1),
(2), (4) Date: Mar. 13, 2013

(87) PCT Pub. No.: WO2013/029544
PCT Pub. Date: Mar. 7, 2013

(65) Prior Publication Data
US 2013/0177278 A1 Jul. 11, 2013

(30) Foreign Application Priority Data
Aug. 29, 2011 (CN) .......................... 2011 1 0250575

(51) Int. Cl.
G02B 6/38 (2006.01)
G02B 6/255 (2006.01)

(52) U.S. Cl.
CPC ............ *G02B 6/3889* (2013.01); *G02B 6/3826* (2013.01); *G02B 6/3846* (2013.01); *G02B 6/2558* (2013.01); *G02B 6/3821* (2013.01)

(58) Field of Classification Search
None
See application file for complete search history.

(56) References Cited

U.S. PATENT DOCUMENTS

| 5,142,601 | A * | 8/1992 | Shibata et al. ................... 385/86 |
| 8,690,454 | B2 * | 4/2014 | Tamekuni et al. .............. 385/60 |
| 2004/0151437 | A1 * | 8/2004 | Marrs et al. ..................... 385/78 |
| 2005/0213897 | A1 * | 9/2005 | Palmer et al. ................... 385/95 |
| 2009/0148102 | A1 * | 6/2009 | Lu et al. .......................... 385/60 |
| 2010/0158452 | A1 * | 6/2010 | Takahashi et al. ............. 385/96 |

(Continued)

FOREIGN PATENT DOCUMENTS

| CN | 201007747 Y | * | 1/2008 |
| CN | 201689194 U | * | 12/2010 |
| CN | 201828686 U | * | 5/2011 |

OTHER PUBLICATIONS

English translation of international preliminary report on patentability for PCT/CN2012/080725, filed Aug. 29, 2012.*

*Primary Examiner* — Michael Stahl
(74) *Attorney, Agent, or Firm* — Jackson IPG PLLC; Demian K. Jackson

(57) ABSTRACT

An on-site hot-melt quick connector for optical fibers comprises a plug housing, a ferrule, an optical fiber telescopic protective tube, a tail end cover, a pressure welding protective tail handle and a compression ring. A front baffle ring is mounted in the plug housing and a rear baffle ring is mounted in the tail end cover. The ferrule and the optical fiber telescopic protective tube are positioned between the front baffle ring and the rear baffle ring and can move in the axial direction. As the quick connector for optical fibers of the invention has a definite space for movement in the axial direction, the optical fibers themselves can move along with the plugging action during butting, avoiding the bending of the optical fibers caused as they are unable to move, thus guaranteeing the transmission quality of the optical signals. The service life of the quick connector is also guaranteed.

9 Claims, 2 Drawing Sheets

(56) References Cited

U.S. PATENT DOCUMENTS

| | | | |
|---|---|---|---|
| 2010/0284653 A1* | 11/2010 | Tamekuni et al. | 385/60 |
| 2011/0008003 A1* | 1/2011 | Tamekuni et al. | 385/72 |
| 2012/0288238 A1* | 11/2012 | Park et al. | 385/80 |
| 2013/0230284 A1* | 9/2013 | Tamekuni et al. | 385/78 |

* cited by examiner

US 9,158,076 B2

ON-SITE HOT-MELT QUICK CONNECTOR FOR OPTICAL FIBERS

TECHNICAL FIELD OF THE INVENTION

The invention relates to optical fiber transmission equipment, in particular to a design on bending-resistant and tension-resistant properties of a quick connector for optical fibers.

BACKGROUND OF THE INVENTION

Generally, a quick connector for optical fibers is fixed in multiple layers in the prior art. Such fixation way protects the optical fibers during the pulling process and improves the tension-resistant property of the optical fiber. However, when butted, ferrules draw back due to the compression of springs, but the optical fibers are bent as they cannot draw back, thus leading to increased loss.

SUMMARY OF THE INVENTION

In the invention, an on-site hot-melt quick connector structure for optical fibers, in which the welding points of the optical fibers are protected inside a tail sleeve, is adopted to solve the technical problem that an independent optical fiber protective cover is required for the welding of the optical fibers.

The on-site hot-melt quick connector for optical fibers provided by the invention to solve the technical problem mentioned above comprises a plug portion, a pressure welding protective tail handle and a compression ring. The plug portion comprises a plug housing, a ferrule arranged in the plug housing and an optical fiber telescopic protective tube. An annular groove into which the compression ring is clamped is arranged on the pressure welding protective tail handle. The plug portion further comprises a tail end cover connected with the plug housing, and two ends of the tail end cover are provided with a first connection end and a second connection end, respectively. The first connection end is connected with the plug housing and the second connection end is connected with the pressure welding protective tail handle. A raised front baffle ring is mounted in the inner hole of the plug housing and an end face of the first connection end of the tail cover is a raised rear baffle ring. The ferrule and the optical fiber telescopic protective tube are connected coaxially and fixedly. The ferrule and at least part of the optical fiber telescopic protective tube are positioned between the front baffle ring and the rear baffle ring and can move in the axial direction. A reset spring is provided between the optical fiber telescopic protective tube and the rear baffle ring.

A further improvement of the invention lies in that a limit stop protruding from the outer surface of the connection end is provided on the connection end of the optical fiber telescopic protective tube and the ferrule, the maximum diameter of the limit stop is greater than the inner diameter of the front baffle ring, the reset spring is sleeved on the optical fiber telescopic protective tube and positioned between the limit stop and the rear baffle ring, the inner hole of the plug housing is a step-shaped hole, and the step between two inner holes is the front baffle ring.

A further improvement of the invention lies in that the quick connector further comprises a welding point protective tube, the heat-shrinkable welding point protective tube is arranged in the middle hole of the pressure welding protective tail handle, the tail end of the optical fiber telescopic protective tube is provided with an annular rough surface, and one end of the heat-shrinkable welding point protective tube is sleeved and then fixed on the rough surface after heat-shrunk. The quick connector further comprises a tail sleeve which is sleeved outside the pressure welding protective tail handle and the compression ring.

The quick connector for optical fibers of the invention has a definite space for movement in the axial direction. The optical fibers themselves can move along with the plugging action during butting, avoiding the bending of the optical fibers caused as they are unable to move, thus guaranteeing the transmission quality of the optical signals. Meanwhile, the service life of the quick connector for optical fibers is also guaranteed.

DETAILED DESCRIPTION OF THE INVENTION

The specific embodiments of the invention will be described with reference to the above drawings.

Figure 1:
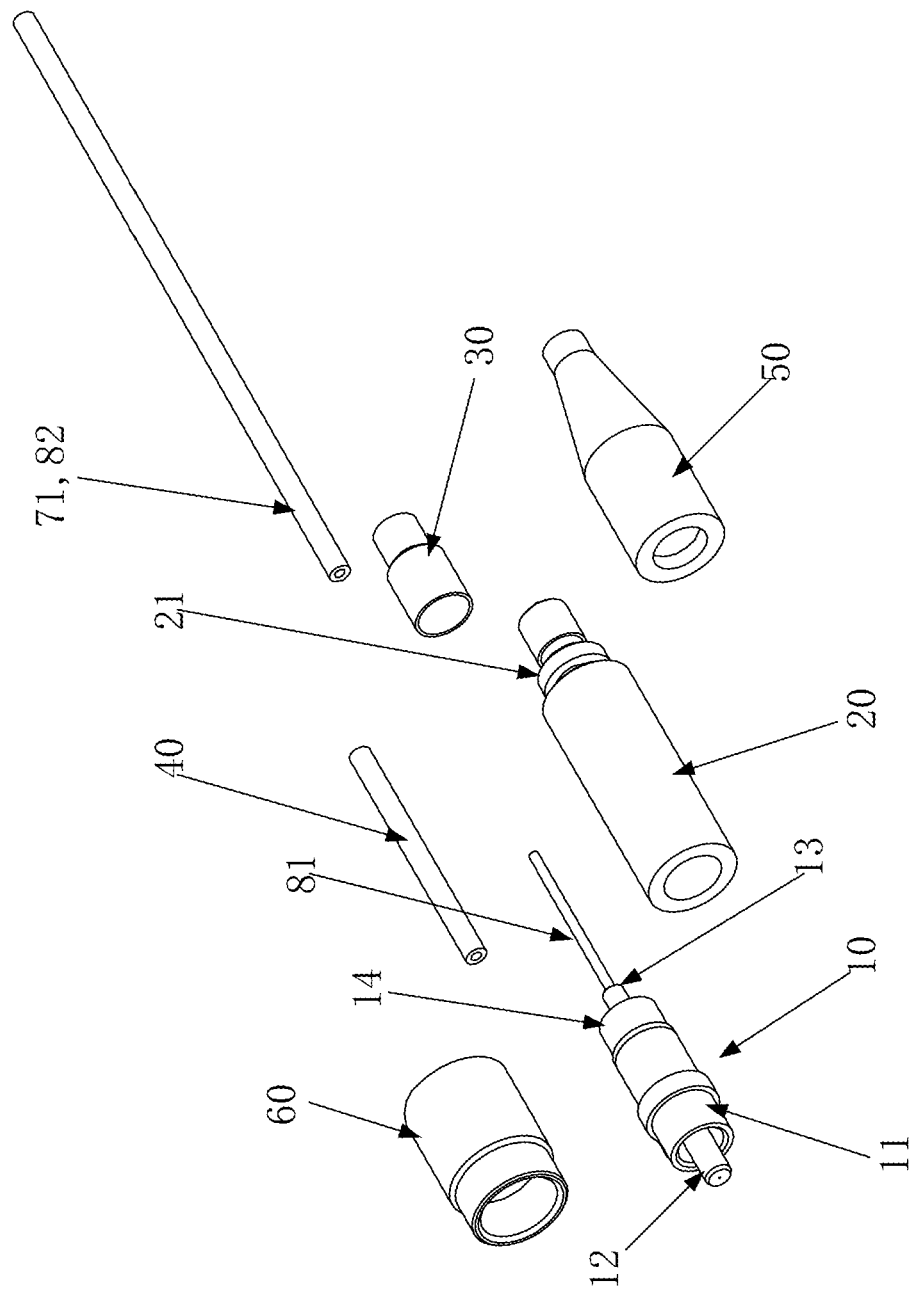
FIG. 1 is an exploded view of an on-site hot-melt quick connector for optical fibers of the invention.
Figure 2:
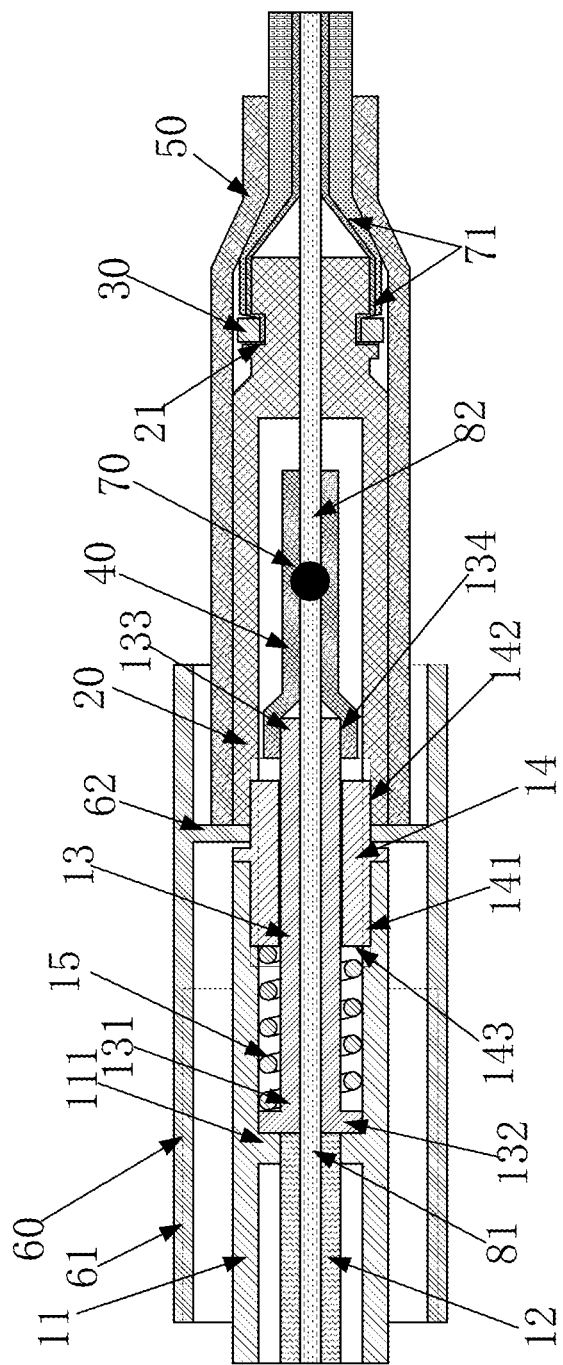
FIG. 2 is a sectional view of the on-site hot-melt quick connector for optical fibers of the invention.

Referring to FIG. 1 and FIG. 2, the on-site hot-melt quick connector for optical fibers comprises a plug portion 10, a pressure welding protective tail handle 20 and a compression ring 30. The plug portion 10 comprises a plug housing 11, a ferrule 12 arranged in the plug housing 11 and an optical fiber telescopic protective tube 13. An annular groove 21 into which the compression ring 30 is clamped is arranged on the pressure welding protective tail handle 20. The plug portion 10 further comprises a tail end cover 14 connected with the plug housing 11, and two ends of the tail end cover 14 are provided with a first connection end 141 and a second connection end 142, respectively. The first connection end 141 is connected with the plug housing 11 and the second connection end 142 is connected with the pressure welding protective tail handle 20. A raised front baffle ring 111 is mounted in the inner hole of the plug housing 11 and an end face of the first connection end 141 of the tail end cover 14 is a raised rear baffle ring 143. The ferrule 12 and the optical fiber telescopic protective tube 13 are connected coaxially and fixedly. The ferrule 12 and at least part of the optical fiber telescopic protective tube 13 are positioned between the front baffle ring 111 and the rear baffle ring 143 and can move in the axial direction. In the invention, one section 81 of two butted optical fibers is embedded in the inner hole of the plug portion 10. The pressure welding protective tail handle 20 is used for protecting the two butted optical fibers. When the compression ring 30 is mounted, both the cable sheath and aramid yarn 71 of another section 82 of the butted optical fibers are embedded and fixed between the compression ring 30 and the annular groove 21. The butted optical fibers 82 are fixed by the compression ring 30. The tail end cover 14 connected with the plug housing 11 makes up a hollow space into which the ferrule 12 and the optical fiber telescopic protective tube 13 are provided. Two ends of the hollow space are provided with the front baffle ring 111 and the rear baffle ring 143, respectively, for limiting the axial movement position. The ferrule 12 and the optical fiber telescopic protective tube 13 have a definite space for axial movement in the hollow space mentioned above. When butted, the ferrules 12 draw back and the optical fiber telescopic protective tube 13 draws back with the ferrules at the same time, therefore, the optical fibers will not be bent or compressed as they cannot draw back, thus guaranteeing the efficiency of optical transmission. Meanwhile, the standard requirements of the test are satisfied in the plug-in/out experiment.

Referring to FIG. 2, a reset spring 15 is also provided between the optical fiber telescopic protective tube 13 and the rear baffle ring 143. A limit stop 132 protruding from the outer surface of the connection end 131 is provided on the connection end 131 of the optical fiber telescopic protective tube 13 and the ferrule 12. The maximum diameter of the limit stop 132 is greater than the inner diameter of the front baffle ring 111. The reset spring 15 is sleeved on the optical fiber telescopic protective tube 13 and positioned between the limit stop 132 and the front baffle ring 111. In the invention, the movement limitation of the front ends of both the optical fiber telescopic protective tube 13 and ferrule 12 is achieved by the limit stop 132 and the front baffle ring 111, preventing the ferrule 12 from protruding from the front end. Meanwhile, the limit stop 132 is also served as the spring seat of the reset spring 15. One end of the reset spring 15 is fixed, and the other end of the reset spring resists against to the rear baffle ring 143, so that the maximum axial movement distance of the optical fiber telescopic protective tube 13 at this end is limited by the rear baffle ring 143. When the inner hole of the plug housing 11 is a step-shaped hole, the step between two inner holes is the front baffle ring 111.

Referring to FIG. 1 and FIG. 2, the quick connector further comprises a welding point protective tube 40 which is provided in the middle hole of the pressure welding protective tail handle 20. The welding point protective tube 40 is a heat-shrinkable sleeve, preferably. The tail end 133 of the optical fiber telescopic protective tube 13 is provided with an annular rough surface 134. One end of the heat-shrinkable welding point protective tube 40 is sleeved and fixed on the rough surface 134 after heat-shrunk. In the invention, the welding point protective tube 40 is used for fixing the two butted optical fibers 81 and 82. After the butted optical fibers 81 and 82 are butted at the hot-melt point 70, the axial positioning and pulling protection performed to the butted optical fibers depends on the welding point protective tube 40. One end of the welding point protective tube 40 is fixed on the butted optical fiber 82, and the other end thereof is sleeved on the tail end 133 of the optical fiber telescopic protective tube 13 after heat-shrunk. When the optical fibers are pulled, the pulling force is mainly stressed on the welding point protective tube 40.

Referring to FIG. 1 and FIG. 2, the quick connector further comprises a tail sleeve 50 which is sleeved outside the pressure welding protective tail handle 20 and the compression ring 30. The tail sleeve 50 is mainly used for protecting the pressure welding protective tail handle 20 and the optical fibers therein. The tail sleeve 50 is a rubber sleeve with a function of buffering external shocks. Meanwhile, such rubber sleeve has better sealing property.

The connection between the first connection end 141 and the plug housing 11, and between the second connection end 142 and the pressure welding protective tail handle 20 is connection by threads, clamping, pressure welding or bonding.

Referring to FIG. 1 and FIG. 2, the quick connector further comprises a locking ring 60 comprising a stop ring 62 protruded in the inner hole of the locking ring 60 and internal threads 61 provided on one side of the stop ring 62, and the stop ring 62 is clamped between the second connection end 142 and the pressure welding protective tail handle 20. The locking ring 60 is mainly used for fixing with a butting connector, the internal threads 61 are used for connecting the butted connector, and the stop ring 62 is used for fixing the connector. The locking ring 60 is tightened after the two connectors are butted, so as to ensure that the two butted connectors are tightly connected and will not get loose.

The above contents are further descriptions of the invention in details in combination with the specific preferred embodiments. However, the embodiments of the invention are not limited to these descriptions. For those skilled in the field, the invention may have various simple deductions or replacements without deviating from the concept of the invention. All these deductions and replacements shall fall into the protection scope of the invention.

What is claimed is:

1. An on-site hot-melt quick connector for optical fibers, comprising:
 a plug portion (10),
 a pressure welding protective tail handle (20),
 a compression ring (30), the plug portion (10) comprising a plug housing (11), a ferrule (12) provided in the plug housing (11) and an optical fiber telescopic protective tube (13), an annular groove (21) being provided on the pressure welding protective tail handle (20), and the compression ring (30) being clamped in the annular groove (21), wherein the plug portion (10) further comprises a tail end cover (14) connected with the plug housing (11), two ends of the tail end cover (14) are provided with a first connection end (141) and a second connection end (142), respectively, the first connection end (141) is connected with the plug housing (11) and the second connection end (142) is connected with the pressure welding protective tail handle (20), a raised front baffle ring (111) is mounted in an inner hole of the plug housing (11) and an end face of the first connection end (141) of the tail end cover (14) defines a raised rear baffle ring (143), the ferrule (12) and the optical fiber telescopic protective tube (13) are coaxially and fixedly connected, and the ferrule (12) and at least part of the optical fiber telescopic protective tube (13) are positioned between the front baffle ring (111) and the rear baffle ring (143) and can move in the axial direction, and
 a welding point protective tube (40) arranged in a middle hole of the pressure welding protective tail handle (20) and wherein one end of the welding point protective tube is fixed on one end of the optical fiber telescopic protective tube (13).

2. The on-site hot-melt quick connector for optical fibers according to claim 1, wherein a reset spring (15) is arranged between the optical fiber telescopic protective tube (13) and the rear baffle ring (143).

3. The on-site hot-melt quick connector for optical fibers according to claim 2, wherein a limit stop (132) protruding from the outer surface of an connection end (131) is provided on the connection end (131) of the optical fiber telescopic protective tube (13), the maximum diameter of the limit stop (132) is greater than the inner diameter of the front baffle ring (111), the reset spring (15) is sleeved on the optical fiber telescopic protective tube (13) and positioned between the limit stop (132) and the rear baffle ring (143).

4. The on-site hot-melt quick connector for optical fibers according to any one of claims 1 to 3, wherein the inner hole of the plug housing (11) is a step-shaped hole and the step between two inner holes is the front baffle ring (111).

5. The on-site hot-melt quick connector for optical fibers according to claim 1, wherein the welding point protective tube (40) is a heat-shrinkable sleeve.

6. The on-site hot-melt quick connector for optical fibers according to claim 5, wherein a tail end (133) of the optical fiber telescopic protective tube (13) is provided with an annular rough surface (134), and one end of the heat-shrinkable welding point protective tube (40) is fixed on the rough surface (134) after heat-shrunk.

7. The on-site hot-melt quick connector for optical fibers according to any one of claims 1 to 3, wherein the quick connector further comprises a tail sleeve (50) which is sleeved outside the pressure welding protective tail handle (20) and the compression ring (30).

8. The on-site hot-melt quick connector for optical fibers according to any one of claims 1 to 3, wherein the connection between the first connection end (141) and the plug housing (11), and between the second connection end (142) and the pressure welding protective tail handle (20) is connection by threads, clamping , pressure welding or bonding.

9. The on-site hot-melt quick connector for optical fibers according to any one of claims 1 to 3, wherein the quick connector further comprises a locking ring (60) comprising a stop ring (62) protruded in the inner hole of the locking ring (60) and internal threads (61) provided on one side of the stop ring (62), and the stop ring (62) is clamped between the second connection end (142) and the pressure welding protective tail handle (20).

\* \* \* \* \*